Aug. 21, 1956 H. H. BLOCK 2,759,736
RIDER PROPELLED GALLOP-SIMULATING HOBBY HORSE
Filed Sept. 17, 1953 2 Sheets-Sheet 1

Inventor
Herman H. Block,
Morris Spector Atty.

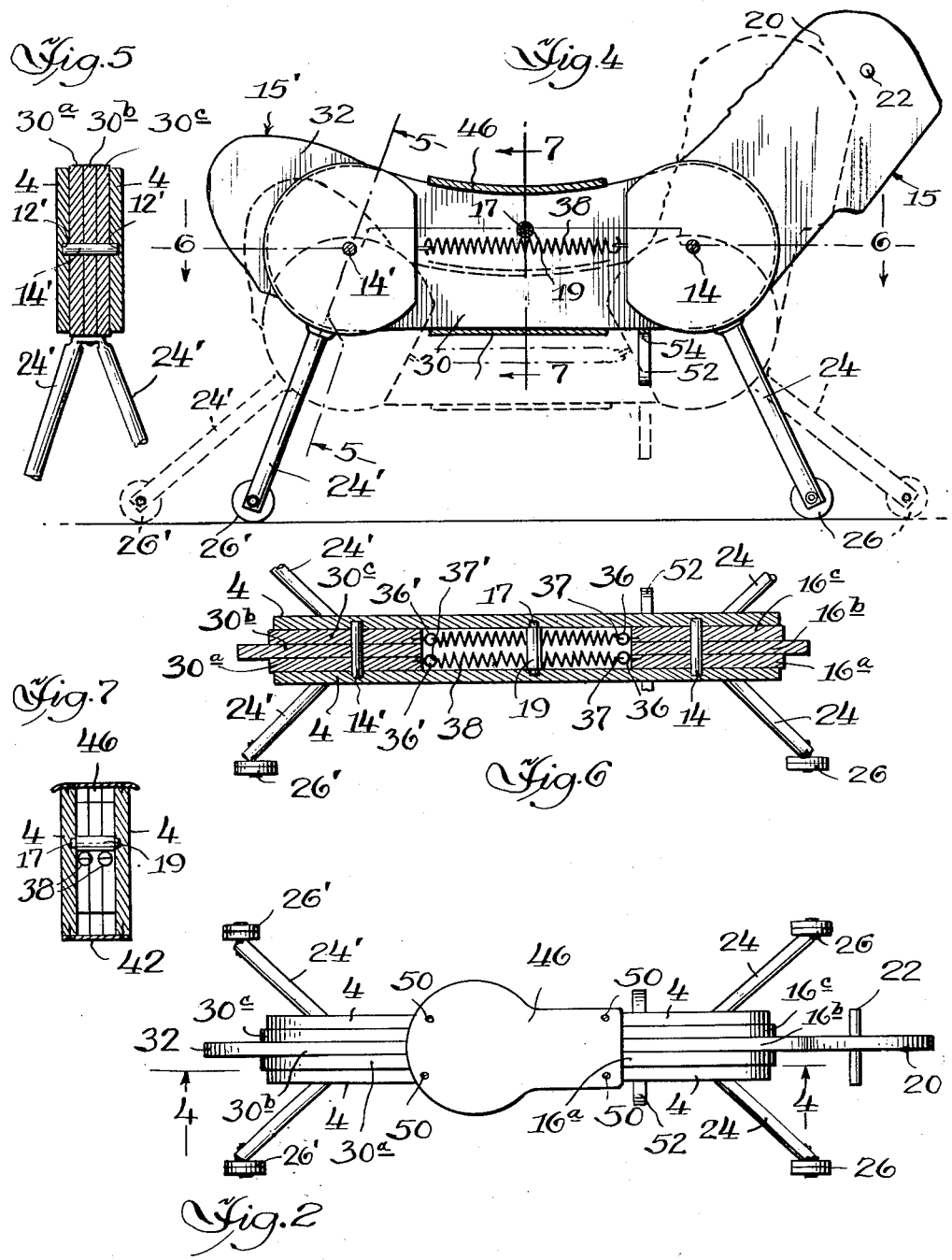

United States Patent Office 2,759,736
Patented Aug. 21, 1956

2,759,736

RIDER PROPELLED GALLOP-SIMULATING HOBBY HORSE

Herman H. Block, Chicago, Ill.

Application September 17, 1953, Serial No. 380,756

12 Claims. (Cl. 280—1.182)

The invention relates to a hobby horse toy and the like; more particularly, the invention relates to a hobby horse play vehicle which both simulates the rocking motion of a horse and also may be propelled by the rocking motion imparted to it.

Hobby horses of the type which are mounted on arcuate legs or mounted on springs to a stationary frame, etc., have been known in the art for years. A child mounts the back of the simulated horse, provided usually with a seat, stirrups, etc., and by shifting his weight is able to rock the toy horse on which he rests. These toys are usually immobile except for a back and forth rocking motion. Recently hobby horses have appeared on the market which may be both rocked and propelled. These devices, however, have been unduly complicated, and hence expensive to manufacture. Further, it has not been possible to propel these prior mobile hobby horses backwards as well as forwards.

The present invention provides a propellable and rockable hobby horse which is of exceedingly simple construction and which is capable of being propelled both in a forward and backward direction.

Briefly, the preferred embodiment of the invention comprises a body shaped to simulate the body of a horse or other animal with a seat on the top thereof, a front leg assembly pivoted to the front of the body, a head simulating the head of a horse which is pivotable with the front leg assembly, and a rear leg assembly which is pivoted to the rear of the horse. A coil spring extends between the front and rear leg assemblies and opposes the pivotal movement thereof. Stirrups are connected to the front of the body and handles are provided on the head to facilitate the rocking and propelling of the hobby horse. A child on the horse may propel the vehicle by transferring his center of gravity in a rocking motion to different positions on the seat or applying varying force to the stirrups or to the handles.

The broader aspects of the invention are not to be limited to a toy vehicle which has the configuration of a horse, or any other animal.

Other features and advantages of the invention will be described in detail in the specification to follow and the drawings showing an illustrative embodiment of the invention wherein:

Fig. 2 is a fragmentary plan view of the embodiment shown in Fig. 1;

Fig. 4 is a sectional view taken along line 4—4 in Fig. 2 and showing, in dotted lines, the position of the hobby horse when the operator is resting with his weight fully on the seat, the solid figure indicating the position of the hobby horse when the operator has transferred his center of gravity to the stirrups and has applied a forward pressure to the head of the hobby horse;

Fig. 5 is a sectional view taken along line 5—5 of Fig. 4;

Fig. 6 is a sectional view taken along line 6—6 in Fig. 4; and

Fig. 7 is a sectional view taken along line 7—7 of Fig. 4.

Figure 1:
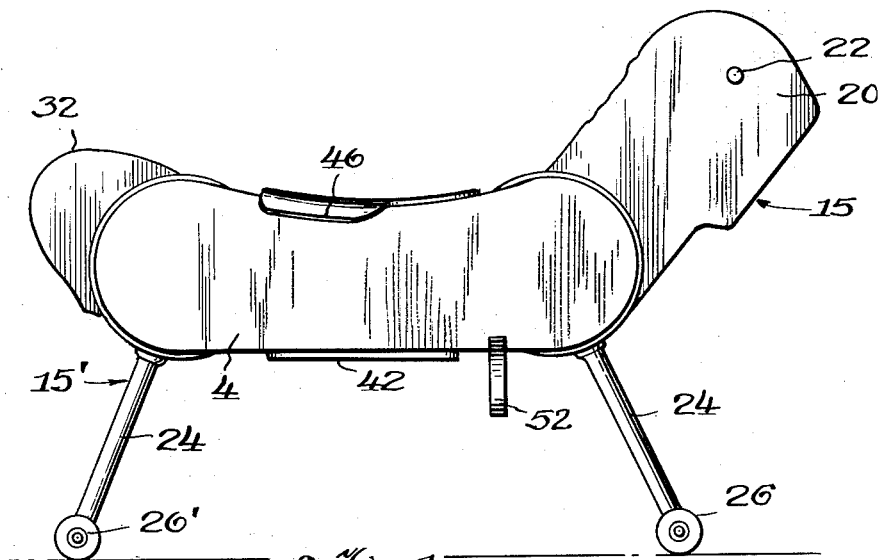
Fig. 1 is a side elevational view of a hobby horse embodiment of the invention.
Figure 3:
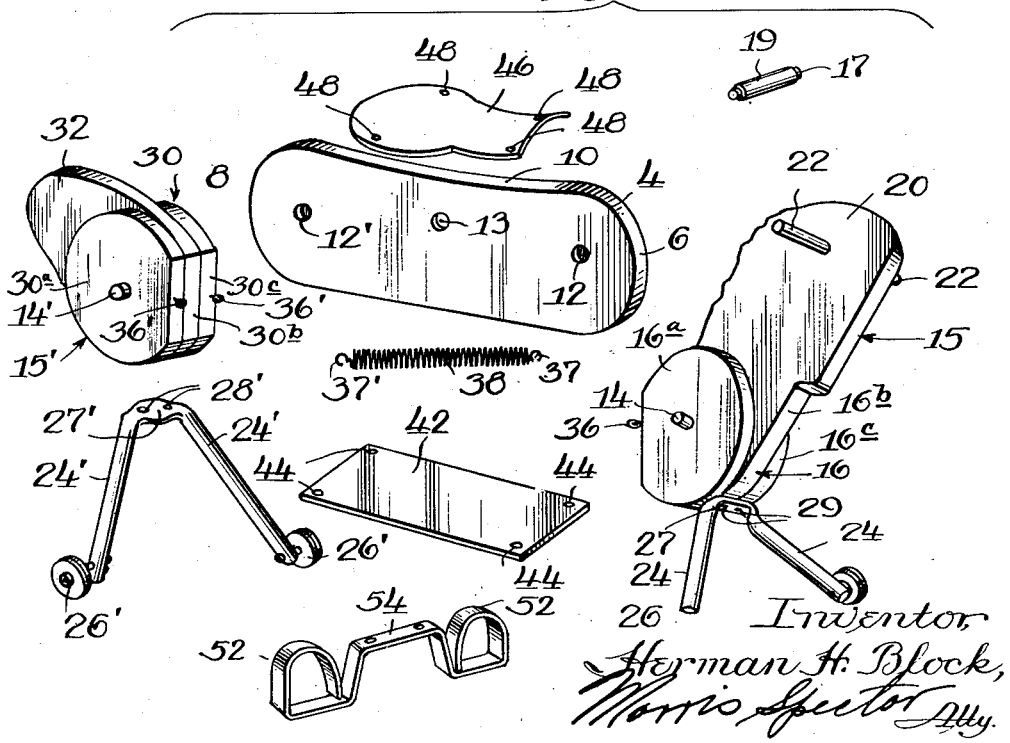
Fig. 3 shows the component parts of the invention in disassembled condition.

The hobby horse embodiment of the invention comprises a pair of separated, wooden outer body members 4—4 simulating opposite sides of a horse. The front and rear profiles 6 and 8 of these body members are shaped to suggest a horse. The central top portion 10 of the outer body members are concave to simulate the back of a horse. On the inner faces of the outer body members 4 are a pair of opposed cylindrical bores, 12 and 12', extending only a portion of the thickness thereof for receiving pins 14 and 14' which are respectively pivotable therein, for reasons to be hereinafter described. The bores 12 and 12' are located, respectively, in the front and rear portions of the outer body members. A bore 13 is located on the inner face of each outer body member about midway between and slightly above the bores 12—12'. Bores 13 extend only part way through the outer body members. Received in the bores 13 are the ends of a pin 17, surrounding which is a rubber sleeve 19. The ends of the sleeve 19 abut the inner faces of the outer body members.

Sandwiched between the outer body members, at the front and rear thereof, are a pair of pivotable assemblies 15—15' which are in pivotal relationship with respect to the outer body members by means of pins 14 and 14', extending laterally from said front and rear assemblies.

The front pivotable assembly 15 includes intermediate body assembly 16 made of three pieces of wood 16a, 16b and 16c, secured together in any suitable manner. The outer pieces 16a and 16c are disc-shaped and are profiled at the front portions thereof similar to that of the front profiles 6 of the outer body members 4. The central piece 16b has a rounded bottom corresponding to the shape of the outer pieces 16a and 16c and includes an extension 20 at the top thereof which is shaped to simulate the shape of the head and neck portions of a horse. When the intermediate body assembly 16 is sandwiched between the front portion of the outer body members 4, the body of the toy horse has thickness to simulate a three-dimensional embodiment thereof. Although the intermediate body assembly 16 and attached head portion may be made from a single piece of wood, three separate pieces of wood are used to simplify the manufacture thereof. The outer faces of these three members 16a, 16b and 16c being parallel flat surfaces, only a simple sawing operation is required to form these pieces, which would not be readily possible if the head portion 20 and intermediate body assembly 16 were made of a single piece of wood.

Extending transversely from the head 20 are a pair of handle bars 22 which are to be gripped by the operator of the toy.

Connected to the bottom of the intermediate body assembly 16 is a front leg assembly including a pair of spaced leg members 24 having wheels 26 at the bottom thereof. The legs 24 may be made from metal tube stock. A bracket portion 27 extends between the top of the leg members 24 and include openings 28 through which screws 29 pass to secure the front leg assembly to the bottom of the intermediate body assembly 16.

The pin 14 extends through the assembly 16 and has ends which project transversely from the outer faces of the outer pieces 16a and 16c, and journalled to the bores 12 on the front of the outer body members 4. In this manner, the head 20, front leg assembly, and front intermediate body assembly 16 pivot as a unit relative to the outer body members 4.

Extending inwardly from the outer pieces 16a and 16c of the intermediate body assembly 16 are a pair of eyelets 36 which are engaged by hooks 37 at one end of a pair of coil springs 38.

The rear pivotable assembly 15' includes a rear intermediate body assembly 30 made of wood and having outer disc-shaped pieces 30a and 30c having profiles similar to the rear profile 8 of the outer body members 4, and an intermediate piece 30b corresponding in shape to the outer pieces 30a and 30c except for a rearwardly extending projecting portion 32, which is shaped to simulate the tail of a horse. As in the case of the front intermediate body assembly 16, the three pieces 30a, 30b and 30c are secured together to form an integral assembly. The rear pin 14' passes through the pieces 30a, 30b and 30c and projects laterally from the outer faces of the outer pieces 30a and 30c and is journalled in the rear bores 12' on the inner faces of the outer body members 4.

Connected to the bottom of the rear intermediate body assembly 30 is a rear leg assembly similar to the front leg assembly, just discussed, and includes metal tubular leg members 24', wheels 26' pivoted to the bottom thereof, and an intermediate bracket member 27' joining the upper portions of the leg members 24'. Openings 28' are provided to receive the shanks of screws (not shown) for securing the rear leg assembly to the bottom of the rear intermediate body assembly 30.

Extending inwardly from the outer intermediate body pieces 30a and 30c are a pair of eyelets 36' which are engaged by hooks 37' at the end of coil springs 38 opposite hooks 37, previously mentioned.

The front and rear intermediate body assemblies 16 and 30 extend only a fraction of the length of the outer body members 4, leaving a space 36 in the central portion of the body of the toy horse for coil springs 38. The top of the coil springs 38 abut the bottom of the sleeve 19 surrounding the pin 17 for reasons to be explained hereinafter.

The coil springs 38 are under tension when the hobby horse is supported on a horizontal floor surface with the front and rear leg assemblies extending downwardly and outwardly as shown in Figs. 1 and 4.

The bottom of the outer body members are held together by a bottom plate member 42 which extends between the bottom and central portions of the outer body members 4. The bottom plate 42 is secured to the outer body members by screws which extend through openings 44 in the four corners thereof. A saddle-shaped member 46, forming a seat 46', extends between the top portions of the outer body members 4 and secures them together, as by screws 50.

A pair of stirrups 52 extend downward on opposite sides of the front portion of the horse. The stirrups are located forwardly of the seat portion 46' and enable the operator to transfer his center of gravity forwardly of the seat 46'. The stirrups 52 are shown formed from a single piece of metal bar stock whose ends are bent backward to form horseshoe-shaped casings for enveloping the upper portion of the feet of an operator. An intermediate bracket portion 54 of the stirrup is secured to the bottom of the outer body member 4.

A child on the hobby horse, by shifting his weight to different positions on the saddle or part of it to the stirrups 52 and to the handle bars 22, may propel the hobby horse forwardly or backwardly. The dotted lines of Fig. 4 illustrate the position of the horse when the child is seated with his full weight on the seat 46', which is at the bottom of his rocking motion; the solid lines thereon illustrate the position of the horse in an upper position of his rocking motion, as when the child has transferred his weight in part or in full to the stirrups 52 and has pushed forwardly on the handles 22. The solid and dotted lines of Fig. 4 are not intended to illustrate the relative forward or backward movement of the hobby horse in these two positions, but only illustrate the different angular positions of the leg assembly with respect to the floor during the rocking of the hobby horse.

In rocking the horse the inertia of the moving parts could carry the front and rear leg assemblies inwardly beyond a vertical position if the pin 17 were absent; the hobby horse could not be operated with the leg assemblies in such a position. With the hobby horse in the position shown in solid lines in Fig. 4, the springs 38 are in line with the pivot pins 14 and 14'. The front and rear leg assemblies are shown extending outwardly from a vertical position. If the leg assemblies were moved inwardly from the position shown, the ends of the springs 38 would be raised above a line extending between the pivot pins 14 and 14'. The center of the spring 38, however, cannot rise above the line because the springs bear up against the pin 17 through the sleeve 19, which pin is fixed relative to the pivot pins 14 and 14'. Springs 38 would then be placed under much greater tension than would be the case if the pin 17 were absent. In this manner, the movement of the leg assemblies inward of a vertical position is prevented. The rubber sleeve 19 acts as a sound deadening member by preventing direct contact between the pin 17 and the springs 38.

The invention thus provides a hobby horse which is of simple construction and which may be easily assembled. In using the device, a child may rock the horse, as in hobby horses of conventional construction, and, in addition, he may propel himself forwards or backwards.

It should be understood that numerous modifications may be made of the preferred embodiment of the invention above described without departing from the broader aspects of the invention.

I claim:

1. A hobby horse or the like comprising a body portion simulating the body of a horse or the like and including a pair of separated outer body members, front and rear intermediate body members sandwiched respectively between the front and rear ends of said outer body members and pivoted thereto, an upwardly extending portion pivotable with said front intermediate body member and simulating the head of a horse or the like, a front leg assembly pivotable with and extending outwardly and downwardly from said front intermediate body member, a rear leg assembly pivotable with and extending outwardly and downwardly from said rear intermediate body member, and resilient means opposing the outward movement of said front and rear leg assemblies.

2. A hobby horse or the like comprising a body portion simulating the body of a horse or the like and including a pair of separated outer body members, front and rear intermediate body members sandwiched respectively between the front and rear ends of said outer body members and pivoted thereto, an upwardly extending portion connected to and pivotable with said front intermediate body member and simulating the head of a horse or the like, a front leg assembly pivotable with said front intermediate body member, a rear leg assembly pivotable with said rear intermediate body member, and a coil spring coupled between said front and rear leg assemblies for opposing the pivotal movement thereof in one direction.

3. A hobby horse or the like comprising a body portion simulating the body of a horse or the like and including a pair of separated outer body members, front and rear intermediate body members sandwiched respectively between the front and rear ends of said outer body members and pivoted thereto, an upwardly extending portion connected to and pivotable with said front intermediate body member, a front leg assembly pivotable with said front intermediate body member, a rear leg assembly pivotable with said rear intermediate body member, and resilient means opposing the pivotal movement of said front and rear leg assemblies in one direction.

4. A hobby horse or the like comprising a body portion simulating the body of a horse or the like and including a pair of separated outer body members, front and rear intermediate body members sandwiched respectively between the front and rear ends of said outer body members and pivoted thereto, a front leg assembly pivotable with said front intermediate body member, a rear leg assembly pivotable with said rear intermediate body member, and resilient means opposing the pivotal movement of said front and rear leg assemblies in one direction.

5. A hobby horse toy or the like comprising a pair of separated outer body members, spaced apart separate front and rear intermediate pivotable members sandwiched respectively between the front and rear ends of said outer body members, respective pivot pin means pivotally supporting said front and rear intermediate members and extending only part way through said outer body members, said front and rear intermediate members including respective front and rear legs, spring means between said outer body members and between said front and rear intermediate members so as to be hidden from view and connected at opposite ends to said front and rear intermediate members, and upper and lower connecting members joining the outer body members together for holding the toy in assembled condition.

6. A hobby horse toy or the like comprising a pair of separated outer body members, front and rear intermediate pivotable members sandwiched respectively between the front and rear ends of said outer body members, respective pivot pin means pivotally supporting said front and rear intermediate members and extending only part way through said outer body members, said front and rear intermediate members including respective front and rear legs, spring means opposing the pivotal movement of said front and rear intermediate members in one direction, and upper and lower connecting members joining the outer body members together for holding the toy in assembled condition.

7. A hobby horse toy or the like comprising a pair of separated outer body members, spaced apart front and rear intermediate pivotable members sandwiched respectively between the front and rear ends of said outer body members, respective pivot pin means pivotally supporting said front and rear intermediate members, said front and rear intermediate members including front and rear legs, and spring means located between said outer body members and between said front and rear intermediate members so as to be hidden from view and connected at opposite ends to said front and rear intermediate members.

8. A hobby horse toy or the like comprising a pair of separated outer body members, front and rear intermediate pivotable members sandwiched respectively between the front and rear ends of said outer body members, respective pivot pin means pivotally supporting said front and rear intermediate members and extending only part way through said outer body members, said front and rear intermediate members including front and rear legs, spring means opposing the pivotal movement of said pivotable components in one direction, and means entirely separate from said pivot pins for holding said outer body members in fixed relation, whereby the toy is held in assembled condition.

9. A hobby horse toy or the like comprising a pair of separated outer body members, spaced apart front and rear intermediate pivotable members sandwiched respectively between the front and rear ends of said outer body members, respective pivot pin means pivotally supporting said front and rear intermediate members, said front and rear intermediate members including front and rear legs normally extending outwardly and downwardly from said intermediate members, spring means located between said outer body members and between said front and rear intermediate members and connected at opposite ends to said front and rear intermediate members, and pin means connected to said outer body members and positioned above said spring means to abut same and oppose the inward movement of said front and rear legs when said legs are nearing a vertical position.

10. A roller supported riding toy adapted to be motivated selectively forwardly and rearwardly over a surface by a rider mounted on the toy applying force on said toy in a corresponding direction, comprising: an elongated body member having front and rear portions and an intermediate rider engaging portion; a front member pivotally mounted on said front portion including a supporting portion normally extending downwardly and forwardly of said pivotal mounting when the toy is riderless; a roller on said supporting portion for contacting said surface; a rear member pivotally mounted on said rear portion having a supporting portion normally extending downwardly and rearwardly when said toy is riderless; a roller on said rear member supporting portion for contacting said surface, each of said pivotally mounted front and rear members being movable away from each other by the weight of a rider on said rider engaging portion; elongated spring means extending between said front and rear members and attached thereto at points spaced from said pivotal mountings, the front and rear members being otherwise unconnected, the spring means constantly urging said front and rear members toward each other and toward said normal positions against the weight of the rider and the spring means being substantially aligned with said pivotal mountings when said front and rear members are in said normal positions and the toy is riderless; and stop means located intermediate the ends of the spring means and above the spring means for engagement therewith to limit the upward movement of the spring means in the area adjacent to the stop means.

11. A roller supported riding toy adapted to be motivated selectively forwardly and rearwardly over a surface by a rider mounted on the toy applying force on said toy in a corresponding direction, comprising: an elongated body member having front and rear portions and an intermediate rider engaging portion; a front member pivotally mounted on said front portion including a supporting portion normally extending downwardly and forwardly of said pivotal mounting when the toy is riderless; a roller on said supporting portion for contacting said surface; a rear member pivotally mounted on said rear portion having a supporting portion normally extending downwardly and rearwardly when said toy is riderless; a roller on said rear member supporting portion for contacting said surface, each of said pivotally mounted front and rear members being movable away from each other by the weight of a rider on said rider engaging portion; and spring means extending between said front and rear members and attached thereto at points spaced from said pivotal mountings, the front and rear members being otherwise unconnected, the spring means constantly urging said front and rear members toward each other and toward said normal positions against the weight of the rider and the spring means being substantially aligned with said pivotal mountings when said front and rear members are in said normal positions and the toy is riderless.

12. A roller supported riding toy adapted to be motivated in a desired direction by a rider mounted on the toy applying force on said toy in a corresponding direction, comprising: an elongated body member having front and rear portions and an intermediate rider engaging portion; a front member pivotally mounted on said front portion including a supporting portion normally extending downwardly and forwardly of said pivotal mounting when the toy is riderless; a roller on said supporting portion for contacting said surface; a rear member on said rear portion having a supporting portion normally extending downwardly and rearwardly when said toy is riderless; a roller on said rear member supporting portion for contacting said surface, each of said front and rear members being movable relatively away from each other by the weight of a rider on said rider engaging portion; spring means operatively attached to said front member and normally spaced from said pivotal mounting, the front and rear members being unconnected, the spring means constantly urging said front and rear members relatively toward each other and toward said normal positions against the weight of the rider and the spring means being substantially unstressed when said front and rear members are in said normal positions and the toy is riderless; and stop means adjacent to and generally above the spring means for engagement therewith to limit the extent of upward movement of the spring means in the area adjacent to the stop means.

References Cited in the file of this patent

UNITED STATES PATENTS

| | | |
|---|---|---|
| 1,193,690 | Houghland | Aug. 8, 1916 |
| 1,440,088 | Kroher | Dec. 26, 1922 |
| 1,553,219 | Crosby | Sept. 8, 1925 |
| 2,015,974 | Stannard | Oct. 1, 1935 |

FOREIGN PATENTS

| | | |
|---|---|---|
| 483,209 | France | Mar. 17, 1917 |
| 570,276 | France | Jan. 15, 1924 |
| 740,319 | France | Nov. 14, 1932 |
| 925,661 | France | Mar. 31, 1947 |